(12) United States Patent
Smalley et al.

(10) Patent No.: US 11,311,811 B1
(45) Date of Patent: *Apr. 26, 2022

(54) SYSTEM AND METHOD FOR DETERMINING A PRICE FOR A PROTECTION EXTENSION

(71) Applicant: Electronic Arts Inc., Redwood City, CA (US)

(72) Inventors: Kellen Christopher Smalley, Pleasanton, CA (US); Stephanie K. Schultz, San Francisco, CA (US)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/790,613

(22) Filed: Oct. 23, 2017

Related U.S. Application Data (63) Continuation of application No. 15/409,068, filed on Jan. 18, 2017, now Pat. No. 9,795,886, which is a
(Continued)

(51) Int. Cl.
*A63F 9/24* (2006.01)
*A63F 13/00* (2014.01)
(Continued)

(52) U.S. Cl.
CPC ............ *A63F 13/792* (2014.09); *A63F 13/35* (2014.09); *A63F 13/822* (2014.09)

(58) Field of Classification Search
CPC .......... A63F 13/40; A63F 13/44; A63F 13/49; A63F 13/69
See application file for complete search history.

(56) References Cited

U.S. PATENT DOCUMENTS

| 5,697,844 A * | 12/1997 | Von Kohorn ........... A63F 13/12 348/E7.024 |
| 7,704,119 B2 * | 4/2010 | Evans .................... A63H 17/14 446/454 |

(Continued)

FOREIGN PATENT DOCUMENTS

| WO | 2010143005 | 2/2010 |
| WO | 2014210279 | 2/2014 |

OTHER PUBLICATIONS

PCT International Preliminary Report on Patentability issued in PCT/US2014/044287 dated Jan. 7, 2016, 6 pages.

*Primary Examiner* — Milap Shah
*Assistant Examiner* — Jason Pinheiro
(74) *Attorney, Agent, or Firm* — Knobbe, Martens, Olson & Bear, LLP (57) ABSTRACT

One aspect of the disclosure relates to determining prices for a protection extension in an online game. The protection extension may be implemented, for example, after a user's beginning protection and/or any other in-game protection period has ceased. The protection extension may be dynamically priced for individual users. The protection extension may be priced, for example, based on the user's power and/or strength in a game, and/or based on other factors. For example, the stronger the user is in the game, the more expensive the extension of protection, and the weaker the user is in the game, the cheaper the extension of protection. This may provide an opportunity for a less experienced player to build up their strength in a game, thus promoting further player engagement. Individualizing the price of protection extensions may provide other enhancements.

18 Claims, 7 Drawing Sheets

Related U.S. Application Data continuation of application No. 13/928,260, filed on Jun. 26, 2013, now Pat. No. 9,573,066.

(51) Int. Cl.
  *G06F 17/00* (2019.01)
  *A63F 13/792* (2014.01)
  *A63F 13/822* (2014.01)
  *A63F 13/35* (2014.01)

(56) References Cited

U.S. PATENT DOCUMENTS

| | | | |
|---|---|---|---|
| 8,113,938 B2 * | 2/2012 | Friedman | G07F 17/3295 463/16 |
| 8,210,934 B2 | 7/2012 | Ocko | |
| 8,235,800 B2 * | 8/2012 | Gingher | G07F 17/32 463/22 |
| 8,260,657 B1 | 9/2012 | Conway | |
| 8,272,956 B2 | 9/2012 | Kelly | |
| 8,348,764 B2 | 1/2013 | Cerbini | |
| 8,360,867 B2 | 1/2013 | VanLuchene | |
| 2004/0104530 A1 * | 6/2004 | Moe | A63F 3/00072 273/242 |
| 2004/0204247 A1 * | 10/2004 | Walker | A63F 13/12 463/42 |
| 2007/0076015 A1 * | 4/2007 | Tanabe | A63F 13/822 345/619 |
| 2008/0004116 A1 * | 1/2008 | Van Luchene | G07F 17/32 463/42 |
| 2008/0070655 A1 * | 3/2008 | Tanabe | A63F 13/58 463/7 |
| 2008/0153562 A1 * | 6/2008 | Ohara | A63F 1/04 463/16 |
| 2011/0107239 A1 * | 5/2011 | Adoni | A63F 13/12 715/757 |
| 2011/0281641 A1 | 11/2011 | Weller | |
| 2012/0108326 A1 * | 5/2012 | Hall | A63F 13/71 463/29 |
| 2012/0238367 A1 | 9/2012 | Kido | |
| 2012/0302353 A1 * | 11/2012 | Yang | H04L 67/38 463/42 |
| 2013/0090161 A1 | 4/2013 | Kislyi | |
| 2015/0005051 A1 | 1/2015 | Smalley | |
| 2016/0279522 A1 * | 9/2016 | de Plater | A63F 13/67 |

\* cited by examiner

SYSTEM AND METHOD FOR DETERMINING A PRICE FOR A PROTECTION EXTENSION

FIELD

The disclosure relates to determining prices for a protection extension in an online game.

BACKGROUND

In various online games, users are provided a minimum time of protection when they start a new game. This allows users to build their city without fear of being attacked. After a certain period of time, the protection expires and users are open to being attacked. This can be detrimental to users who are not prepared to be attacked. Too great of a defeat may even discourage users from continuing game play.

SUMMARY

One aspect of the disclosure relates to determining prices for a protection extension in an online game. The protection extension may be implemented, for example, after a user's beginning protection and/or any other in-game protection period has ceased. The protection extension may be dynamically priced for individual users. The protection extension may be priced, for example, based on the user's power and/or strength in a game, and/or based on other factors. For example, the stronger the user is in the game, the more expensive the extension of protection, and the weaker the user is in the game, the cheaper the extension of protection. This may provide an opportunity for a less experienced player to build up their strength in a game, thus promoting further player engagement. Individualizing the price of protection extensions may provide other enhancements.

A system configured to determine prices for a protection extension in an online game may include one or more processors configured to execute compute program modules. The program modules may comprise a game module, a user module, an interaction module, relationship module, a network module, a protection module, a store module, an extension module and/or any other modules.

The game module may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users. The game space may be configured to provide game entities to users.

The game module may be configured to provide an offer for extension of protection and/or any other game parameter. The protection may be the beginner's protection and/or any other protection. The game module may be configured to provide an offer for extension of protection. The protection may be purchased through the store module and/or any other module.

A user module may be configured to manage user profiles. The user profiles may include in-game parameters of the users that characterize gameplay of the individual users. The user profiles may include a first user profile of a first user. User information may be stored in user accounts and/or profiles. User accounts may be an account on a video game central server or within a peer-to-peer network that contains a user profile including personal, billing, and character account information and/or any user related information. A user attribute may be any attribute that can be applied to a user account. User attributes may include, but not be limited to: real currency, discount of monthly fees for playing game, monthly fee for playing a game, interest rates for use of or borrowing real or virtual cash amounts, global character attribute settings for all characters created by player across multiple games, rewards for encouraging another player to sign up to play and/or any other attributes.

A protection module may be configured to provide protection to one or more game entities associated with the users which are protected during a protection time period. The users may include a first user and/or any other user. In some implementations, while under protection, game entities may be immune from in-game attacks. The protection module may be configured to provide protection to one or more game entities comprising one or more: characters, troops, cities, castles, and/or dragons and/or any other virtual item and/or character.

A store module may be configured to effectuate presentation of offers to sell virtual items to the users. The virtual items may include an extension item that is usable in the game space to initiate a protection time period for one or more game entities. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

An extension module may be configured to determine a cost of the extension item individually for the users based on in-game parameters for the users. The cost of the extension item for the first user may be determined based on the in-game parameters in the first user profile and/or any other profile.

The extension module may be configured to determine a power parameter value for the users during the protection time period such that a power parameter value may be determined based on relative user strength in the game for the first user during the protection time period. The extension module may be configured such that the relative user strength is determined based on one or more of: in-game troops, virtual currency, one or more resources, user level in game, successful attacks, successful defenses, virtual technology level, virtual civilian population, number of cities or realms, acquired cities and/or any other in game parameter.

The extension module may determine an end time for the protection time period based on the power parameter value and/or any other in game parameter. The extension module may be configured such that responsive to a determination that the user obtains a threshold power parameter value during the protection time period and/or any other time period an offer for extension is provided. The extension module may be configured such that the in-game parameters comprise one or more: power parameter value for the first user, power parameter values for neighboring users, susceptibility to being attacked by neighboring users, rate of being raided by neighboring users and/or based on any other in game parameter. The neighboring users may be determined based on a proximate location and/or any other location relative to the first user and/or any other user.

The extension module may be configured such that responsive to the in-game parameters for the first user indicating a relatively high strength of the first user in-game, the cost of an extension item for the first user is increased and/or decreased. The user profiles may further include a second user profile for a second user and/or any other user. The extension module may be further configured such that responsive to the in-game parameters for the first user and the in-game parameters for the second user indicating a higher in-game strength for the first user than the second user, a cost of an extension item is determined to be greater and/or less for the first user than a cost of an extension item for the second user and/or any other user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
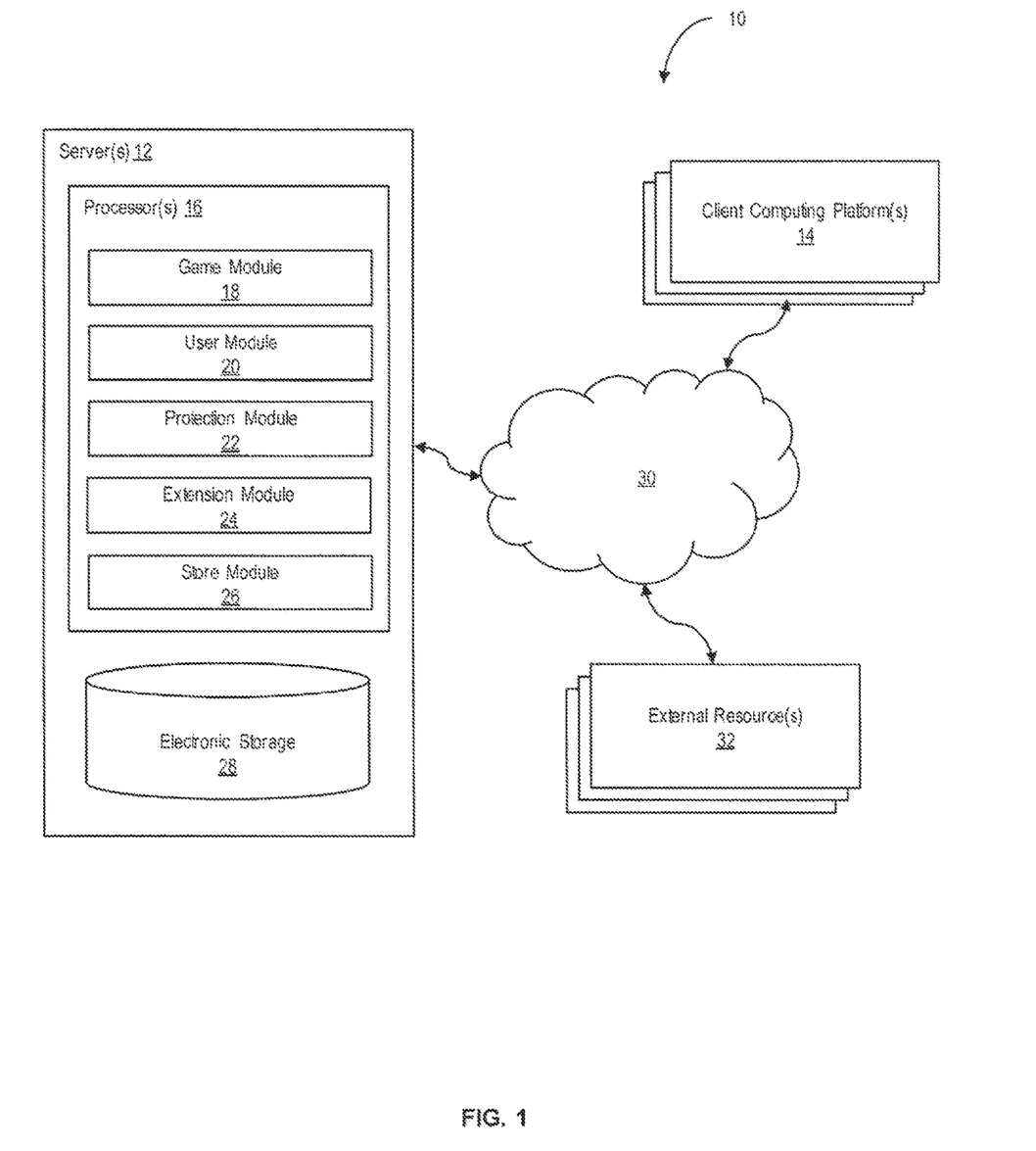
FIG. 1 illustrates an exemplary system configured to determine prices for a protection extension in an online game, according to an aspect of the invention.

FIG. 1 illustrates an exemplary system configured to determine prices for a protection extension in an online game, according to an aspect of the invention. The program modules may comprise a game module 18, a user module 20, an interaction module, a network module, a protection module 22, an extension module 24, a store module 26 and/or any other modules. In some implementations, system 10 may include a game server(s) 12. The game server(s) 12 may host a game space in which an online game takes place. The game server(s) 12 may be configured to communicate with one or more client computing platform(s) 14 according to a client/server architecture. The users may access system 10 and/or the virtual space via client computing platform(s) 14.

The game server(s) 12 may be configured to execute one or more computer program modules. The computer program modules may include one or more of a game module 18, a user module 20, an interaction module, a network module, a protection module 22, an extension module 24, a store module 26 and/or any other modules and/or any other modules.

The game module 18 may be configured to execute a game instance of a game space. The game instance may be used to facilitate presentation of views of the game space to users. The game instance may be configured to facilitate interaction of the users with the game space and/or each other by performing operations in the game instance in response to commands and/or any other input received from the users. The game space may be configured to provide game entities to users.

The game module 18 may be configured to provide an offer for extension of protection and/or any other game parameter. The protection may be the beginner's protection and/or any other protection. The game module 18 may be configured to provide an offer for extension of protection. The protection may be purchased through the store module and/or any other module. The state may then be communicated (e.g., via streaming visual data, via object/position data, and/or other state information) from server(s) 12 to client computing platform(s) 14 for presentation to users. The state determined and transmitted to a given client computing platform(s) 14 may correspond to a view for a user character being controlled by a user via the given client computing platform(s) 14. The state determined and transmitted to a given client computing platform(s) 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platform(s) 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by game module 18 is not intended to be limiting. The game module 18 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by game module 18, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by controlling one or more of the available user controlled elements in the virtual space. Control may be exercised through control inputs and/or commands input by the users through client computing platform(s) 14. The users may interact with each other through communications exchanged within the virtual space. Such communications may include one or more of textual chat, instant messages, private messages, voice communications, and/or other communications. Communications may be received and entered by the users via their respective client computing platform(s) 14. Communications may be routed to and from the appropriate users through server(s) 12 (e.g., through game module 18).

A user module 20 may be configured to manage user profiles. The user profiles may include in-game parameters of the users that characterize gameplay of the individual users. The user profiles may include a first user profile of a first user. User information may be stored in user accounts and/or profiles. User accounts may be an account on a video game central server or within a peer-to-peer network that contains a user profile including personal, billing, and character account information and/or any user related information. A user attribute may be any attribute that can be applied to a user account. User attributes may include, but not be limited to: real currency, discount of monthly fees for playing game, monthly fee for playing a game, interest rates for use of or borrowing real or virtual cash amounts, global character attribute settings for all characters created by player across multiple games, rewards for encouraging another player to sign up to play and/or any other attributes.

The system may comprise a user module 20 configured to store inventories of virtual items that are available to users in the game space. The inventories may include a first inventory and/or any other inventory of virtual items available to a first user in the game space. The user module 20 may be configured to access and/or manage one or more user profiles and/or user information associated with users of the system 10. The one or more user profiles and/or user information may include information stored by game server(s) 12, one or more of the client computing platform(s) 14, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The user module 20 may be configured to store inventories of virtual items including resources that are available to users in the virtual space. Various matters may be collected in an inventory. These matters may include, but are not limited to, virtual items, virtual resources, character attributes, character skills, and/or virtual currency. A virtual item may be an item that can be used in a virtual world to assist a player's character. Examples of virtual items include, but are not limited to, valuables (money, valuable metals or gems, etc.), weapons, spell components, defense components, and/or armor. A virtual resource may be a resource that can be used in the virtual world to create game attributes. Examples of virtual resources include wood, stone, herbs, water, ores, animals, monsters, bosses, non-player characters (NPCs), building materials, potions, etc. A character attribute may be any quality, trait, feature and/or characteristic a particular character can have. Character attributes may include, but are not be limited to: a character score, a virtual object, the physical appearance of a character, an emblem or mark, a synthetic voice, virtual currency, virtual help points or credits, the ability to join groups of other players at a later time, a score for subsequent matching of later game parameters, a relationship with another character, a genetic profile or makeup, a skill or skill level, and/or a ranking. Character skills may be game attributes inherent in or acquired by a player character during game play such as, but not limited to: the ability to cast (certain) spells, foretell the future, read minds, use (certain) weapons, cook, hunt, find herbs, assemble herbs into potions, mine, assemble objects into other objects, fly, and/or enchant other player characters.

The user maintains an inventory for the user's character in which virtual awards may be collected. The inventory may be accessed through an interface. As the character progresses through the game it may receive access to higher-level gear. Higher-level gear may be more powerful and/or effective within the game. This may include having parameters (e.g., hit points, attack strength, defense points, speed, etc.) that enhance the functionality of the gear in the game. The player may be able to review items within the player's inventory and equip the character with an item appropriate to the current game situation. Items may be dragged from the inventory to a preview window. As items are selected, they may appear either on or next to the character. For example, if the character is currently not wearing any armor and/or accessories, armor and accessories such as a cape may be added by accessing the character's inventory. Management of a character's inventory is a common game mechanic, and may lead to many hours of game play. Players may collect, trade, buy, fight over items, and/or perform other actions to add to their inventory. Games in different genres, such as science fiction, may incorporate items specific to that genre. For example, laser guns may be substituted in place of swords as the standard weapon used by characters within a science fiction-type game. The data describing clothing and other equipment or gear may be stored in the character record.

Players within the game may acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. A player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

Virtual currency may be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

Multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. Virtual cash may also be awarded for leveling up in the game.

The interaction module may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module in monitoring the interactions of the users may be stored to the user profiles managed by user module 20.

At a given time, interaction module may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

Network module of the game server(s) 12 may be configured to maintain a connection to the one or more client computing platform(s) 14. For example, the network module may maintain one or more communication lines or ports to enable connection and/or exchange of information with a network 40 and/or other computing platform(s) 14. Information such as state information, game state and game logic may be communicated via network module. The network module may be configured to receive information from the client computing platform(s) 14 as well.

A protection module 22 may be configured to provide protection to one or more game entities associated with the users which are protected during a protection time period. The users may include a first user and/or any other user. In some implementations, while under protection, game entities may be immune from in-game attacks. The protection module may be configured to provide protection to one or more game entities comprising one or more: characters, troops, cities, castles, and/or dragons and/or any other virtual item and/or character.

An extension module 24 may be configured to determine a cost of the extension item individually for the users based on in-game parameters for the users. The cost of the extension item for the first user may be determined based on the in-game parameters in the first user profile and/or any other profile.

The extension module 24 may be configured to determine a power parameter value for the users during the protection time period such that a power parameter value may be determined based on relative user strength in the game for the first user during the protection time period. The extension module 24 may be configured such that the relative user strength and/or the amount of power of the users is determined based on one or more of: in-game troops, completion of tasks, virtual currency, one or more resources, user level in game, successful attacks, successful defenses, virtual technology level, virtual civilian population, number of cities or realms, acquired cities and/or any other in game performance parameter and/or user metric.

Tasks shall include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income; earning a higher rank in an army; winning an election among two or more player characters; achieving deity or other status; improving player character status or caste; assisting other player characters with any of the above; speed of accomplishing or changing the rate or trends of any or all of the above.

In some implementations, players within the game can acquire virtual currency. In such games, the virtual currency might be represented by virtual coins, virtual cash, or by a number or value stored by the server for that player's benefit. Such virtual currency represents units of value for use in the online game system, and is analogous to legal currency. Virtual currency can be purchased in one or more actual cash or credit transactions by a player, where the legal currency is transferred using a credit/debit/charge card transaction conveyed over a financial network. In some embodiments, a player may earn virtual currency by taking action in the game. For example, a player may be rewarded with one or more units of virtual currency after completing a task, quest, challenge, or mission within the game. For example, a farming game might reward 10 gold coins each time a virtual crop is harvested.

In some implementations, virtual currency can be used to purchase one or more in-game assets or other benefits. For example, a player may be able to exchange virtual currency for a desired level, access, right, or item in an online game. In some implementations, legal currency can be used to directly purchase an in-game asset or other benefit. The player can select the desired in-game asset or other benefit. Once the necessary selections are made, the player can place the order to purchase the in-game asset or other benefit. This order is received by the game system, which can then process the order. If the order is processed successfully, an appropriate financial account associated with the player can be debited by the amount of virtual currency or legal currency needed to buy the selected in-game asset or other benefit.

In some implementations, multiple types of virtual currency may be available for purchase from the game system operator. For example, an online game may have virtual gold coins and virtual cash. The different types of virtual currency may have different exchange rates with respect to legal currency and each other. For example, a player may be able to exchange $1 in legal currency for either 100 virtual gold coins or $2 in virtual cash, but virtual gold coins may not be exchanged for virtual cash. Similarly, where in-game assets and other benefits can be purchased with virtual currency, they may have different exchange rates with respect to the different types of virtual currency. For example, a player may be able to buy a virtual business object for $10 in virtual cash, but may not purchase the virtual business object for virtual gold coins alone. In some embodiments, certain types of virtual currency can be acquired by engaging in various in-game actions while other types of virtual currency can only be acquired by exchanging legal currency. For example, a player may be able to acquire virtual gold coins by selling virtual goods in a business, but can only acquire virtual cash by exchanging legal currency. In some implementations, virtual cash may also be awarded for leveling up in the game.

The extension module 24 may be configured to determine a power parameter value for the users based on user metrics. The power parameter of the users may include a first amount of power corresponding to the first user and/or any other user. The power parameter of the users may be configured based on any in game performance parameter, and/or any aspect of a game by which a player character's performance can be measured. Game parameters shall include, but not be limited to: completing all or part of a mission; playing for a certain period of time; winning a match against another player character or computer generated character; reaching a certain level or score; using or obtaining an ability or technology; kill/death ratios; obtaining, creating or modifying an object; solving a puzzle; accuracy with weapons; effective use of the proper weapon; killing a certain character/creature; getting through or to a certain geographic area; decreasing or increasing Karma Points; getting, buying, exchanging or learning a new skill or player attribute; having a child; getting married; obtaining, buying, trading, producing or developing raw materials; producing goods or services; earning income; earning a higher rank in an army; winning an election among two or more player characters; achieving deity or other status; improving player character status or caste; assisting other player characters with any of the above; speed of accomplishing or changing the rate or trends of any or all of the above.

The user metric may quantify one or more of a progress within the game, a power level within the game, a skill level within the game, a level of virtual technology advancement within the game, success within the game as a whole or within certain types of gameplay (e.g., player-versus-player gameplay, player-versus-environment gameplay, harvesting gameplay, and/or other gameplay types), and/or other aspects. A metric can be classified as a status metric or a predictive metric. A status metric characterizes behavioral information of a set of on-line entities where the behavioral information is related to at least one activity of the on-line entities within the persistent virtual environment. Example status metrics include, without limitation, a prominence metric, a centrality degree metric, a cohesive subgroup metric, a group level equivalence metric, a leadership metric, a strength of ties metric, an interactivity metric, a topic of interaction metric, a role metric, a social accounting metric, a game-play metric, a modeling metric, and an interaction topic metric as well as other metrics. These metrics are subsequently briefly described.

A predictive metric can, for example, evaluate the change in a status metric over time. Example predictive metrics include, without limitation: a churn metric, a compatibility metric, a scheduling metric, a content consumption metric, an environmental balance metric, a survival metric, and an economic metric. "Churn" metrics predict the probability of a player leaving the persistent virtual environment, based on the player's past interaction patterns. Compatibility metrics indicate whether or not a player's play style will match a proposed player association or whether the player's play style matches that of the player association to which he/she is a member. Scheduling metrics predict the probability of a player being available for a future joint activity, so that such activities can be planned in advance. Content consumption metrics predict when players will have exhausted the persistent virtual environment's resources, in order to plan timely expansions to the persistent virtual environment. Environmental balance metrics predict the effects of a design change on the persistent virtual environment, such as removing a given "profession" or certain items from the persistent virtual environment. Economic metrics predict inflation, trade volume, and other variables in order to maintain the balance of trade in the persistent virtual environment. The survival metric indicates the health of a player association.

The predictive metrics can include those that develop a time-series of single or combinations of status metrics (weighted or un-weighted) that represent trends; metrics that represent heuristically determined conditions relevant to the predicted health of the persistent virtual environment; metrics based on a vector of attributes representing characteristics of the on-line entity such that the vectors can be used to classify on-line entities and to determine the characteristics of successful on-line entities; and to determine whether on-line entities have characteristics that are progressing toward or away from the characteristics of successful online entities.

The classification of the on-line entities can utilize a Bayesian network, spectral analysis, nearest neighbor techniques or any other classification mechanism. The predictive metrics can timely measure the social aspects of player interactions in the persistent virtual environment, and measure and/or monitor the health of the online player community in a persistent virtual environment. By using the predictive metrics, the MMOG provider can alter the persistent virtual environment to encourage desired social interactions and to discourage less desired social interactions.

The extension module 24 may determine an end time for the protection time period based on the power parameter value and/or any other in game parameter. The extension module 24 may be configured such that responsive to a determination that the user obtains a threshold power parameter value during the protection time period and/or any other time period an offer for extension is provided. The extension module 24 may be configured such that the in-game parameters comprise one or more: power parameter value for the first user, power parameter values for neighboring users, susceptibility to being attacked by neighboring users, rate of being raided by neighboring users and/or based on any other in game parameter. The neighboring users may be determined based on a proximate location and/or any other location relative to the first user and/or any other user.

The extension module 24 may be configured such that responsive to the in-game parameters for the first user indicating a relatively high strength of the first user in-game, the cost of an extension item for the first user is increased and/or decreased. The user profiles may further include a second user profile for a second user and/or any other user. The extension module 24 may be further configured such that responsive to the in-game parameters for the first user and the in-game parameters for the second user indicating a higher in-game strength for the first user than the second user, a cost of an extension item is determined to be greater and/or less for the first user than a cost of an extension item for the second user and/or any other user.

A store module 26 may be configured to present a store interface to the users. The store interface may present offers to users to buy item instances of virtual items. The virtual items may include a first virtual item and/or any other item. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

A store module 26 may be configured to effectuate presentation of offers to sell virtual items to the users. The virtual items may include an extension item that is usable in the game space to initiate a protection time period for one or more game entities. A virtual item may be an item that can be used in the game instance by the user. For example, a virtual item may be used to assist a player's character, and/or in other ways. Examples of virtual items include, but are not limited to, resources, currency, valuables (money, valuable metals or gems, etc.), weapons, spell components, defense components, armor, mounts, pets, attire, power ups, and/or other items.

The store module 26 may be configured to effectuate presentation to the users of offers to purchase resources. The offers may include a first offer for the first user to purchase a first set of one or more virtual items. The virtual items may include a virtual good, a virtual currency, and/or other virtual items as described above. For example, the store module may be configured such that the offers presented to the first user may be restricted to offers having prices in a first price range. The first price range may be determined based on the user metric for the first user, and/or the user metric for other users. The store module may be configured such that the first price range may change as participation by the first user in the game causes the user metric for the first user to change. The store module may be configured such that the first price range may be bounded by one or more both of a minimum value and/or a maximum value. The store module may be configured such that the offers having prices below the minimum value may not be available for purchase by the first user. The store module may be configured such that offers having prices above the maximum value may be locked. This may mean the offers having prices above the maximum value may be unavailable for purchase by the first user independent from whether the first user has consideration sufficient to purchase such offers. Such offers may become unlocked as the maximum value of the price range is adjusted above the prices of such offers.

For example, players' experience with pricing of in-game goods may be associated with their progress in the game. In some implementations, the higher the level of the player, the lower the in-game goods may cost. Depending on the level of the player, the goods available to the player may change. Overall, the more the player advances in the game, new items may be unlocked to the player for purchase. Goods previously provided to the player for purchase may or may not be accessible to the player depending on the player's level.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

The game server(s) 12, client computing platform(s) 14, and/or external resource(s) 32 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which game server(s) 12, client computing platform(s) 14, and/or external resource(s) 32 may be operatively linked via some other communication media.

Game server(s) 12 may include electronic storage 28, one or more processors 16, and/or other components. Game server(s) 12 may include communication lines, or ports to enable the exchange of information with a network 30 and/or other computing platforms 14. Illustration of game server(s) 12 in FIG. 1 is not intended to be limiting. Game server(s) 12 may include a plurality of hardware, software, and/or firmware components operating together to provide the functionality attributed herein to game server(s) 12. For example, game server(s) 12 may be implemented by a cloud of computing platforms operating together as game server(s) 12.

Electronic storage 28 may comprise non-transitory storage media that electronically stores information. The electronic storage media of electronic storage 28 may include one or both of system storage that is provided integrally (i.e., substantially non-removable) with game server(s) 12 and/or removable storage that is removably connectable to game server(s) 12 via, for example, a port (e.g., a USB port, a firewire port, etc.) or a drive (e.g., a disk drive, etc.). Electronic storage 28 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 28 may include one or more virtual storage resources (e.g., cloud storage, a virtual private network, and/or other virtual storage resources). Electronic storage 28 may store software algorithms, information determined by processor 16, information received from game server(s) 12, information received from client computing platform(s) 14, and/or other information that enables game server(s) 12 to function as described herein.

Processor(s) 16 is configured to provide information processing capabilities in game server(s) 12. As such, processor(s) 16 may include one or more of a digital processor, an analog processor, a digital circuit designed to process information, an analog circuit designed to process information, a state machine, and/or other mechanisms for electronically processing information. Although processor(s) 16 is shown in FIG. 1 as a single entity, this is for illustrative purposes only. In some implementations, processor(s) 16 may include a plurality of processing units. These processing units may be physically located within the same device, or processor(s) 16 may represent processing functionality of a plurality of devices operating in coordination. The processor(s) 16 may be configured to execute modules 18, 20, 22, 24, and/or 26. Processor(s) 16 may be configured to execute modules 18, 20, 22, 24, and/or 26 by software; hardware; firmware; some combination of software, hardware, and/or firmware; and/or other mechanisms for configuring processing capabilities on processor(s) 16. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 18, 20, 22, 24, and/or 26 are illustrated in FIG. 1 as being implemented within a single processing unit, in implementations in which processor includes multiple processing units, one or more of modules 18, 20, 22, 24, and/or 26 may be implemented remotely from the other modules. The description of the functionality provided by the different modules 18, 20, 22, 24, and/or 26 described below is for illustrative purposes, and is not intended to be limiting, as any of modules 18, 20, 22, 24, and/or 26 may provide more or less functionality than is described. For example, one or more of modules 18, 20, 22, 24, and/or 26 may be eliminated, and some or all of its functionality may be provided by other ones of modules 18, 20, 22, 24, and/or 26. As another example, processor 16 may be configured to execute one or more additional modules that may perform some or all of the functionality attributed below to one of modules 18, 20, 22, 24, and/or 26.

A given client computing platform(s) 14 may include one or more processors configured to execute computer program modules. The computer program modules may be configured to enable an expert or user associated with the given client computing platform(s) 14 to interface with system 10, game server(s) 12, and/or external resources 32, and/or provide other functionality attributed herein to client computing platform(s) 14. By way of non-limiting example, the given client computing platform(s) 14 may include one or more of a desktop computer, a laptop computer, a handheld computer, a tablet computing platform, a NetBook, a Smartphone, a gaming console, and/or other computing platforms.

External resource(s) 32 may include sources of information, hosts and/or providers of virtual spaces outside of system 10, external entities participating with system 10, and/or other resources. In some implementations, some or all of the functionality attributed herein to external resources 32 may be provided by resources included in system 10.

Figure 2:
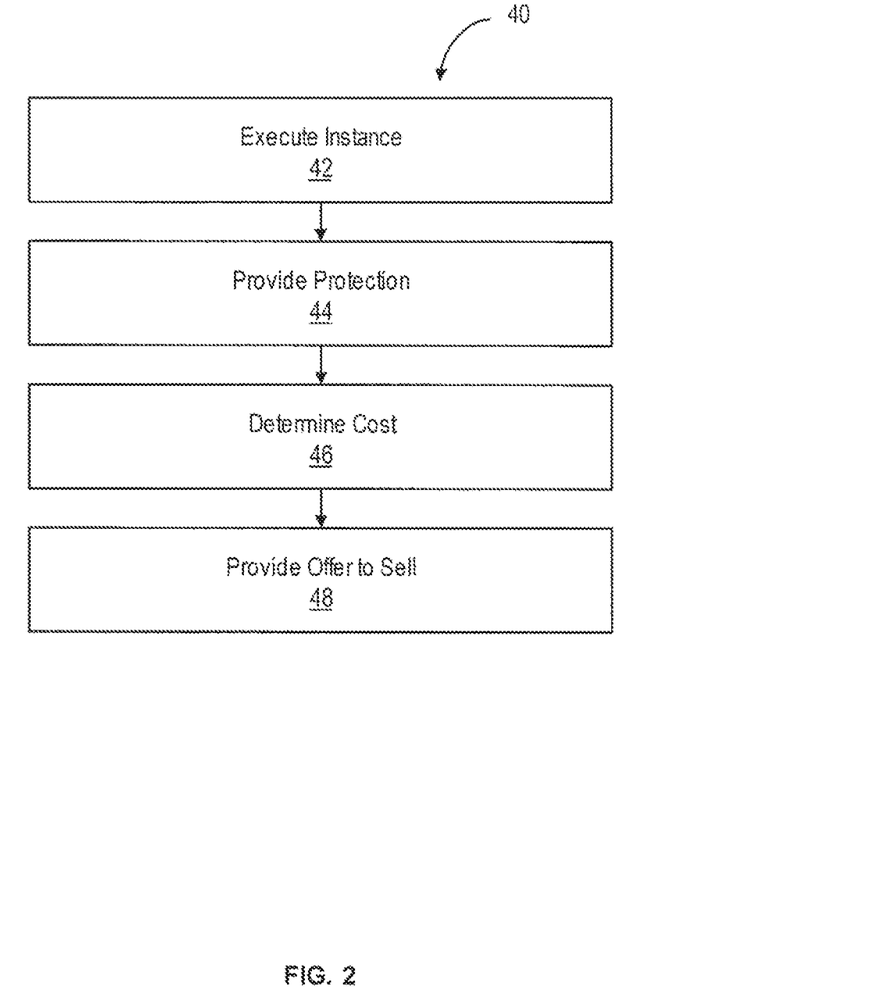
FIG. 2 illustrates an exemplary method of determining prices for a protection extension in an online game, according to an aspect of the invention.

FIG. 2 illustrates an exemplary method of determining prices for a protection extension in an online game, according to an aspect of the invention.

The operations of method 40 presented below are intended to be illustrative. In some embodiments, method 40 may be accomplished with one or more additional operations not described, and/or without one or more of the operations discussed. Additionally, the order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 50.

At an operation 42, an instance of a virtual space may be executed. In some implementations, operation 42 may be performed by a game module the same as or similar to game module 18 (shown in FIG. 1 and described above).

At an operation 44, the executed instance of the virtual space may be implemented to provide protection. Protection may be provided to one or more game entities associated with the users which are protected during a protection time period. In some implementations, operation 44 may be performed by a protection module the same as or similar to protection module 22 (shown in FIG. 1 and described above).

At an operation 46, costs may be determined. Costs of the extension item individually for the users based on in-game parameters for the users may be determined. In some implementations, operation 46 may be performed by an extension module the same as or similar to extension module 24 (shown in FIG. 1 and described above).

At an operation 48, an offer to sell may be provided. Presentation of offers to sell virtual items to the users may be provided. The virtual items may include an extension item that is usable in the game space to initiate a protection time period for one or more game entities. In some implementations, operation 48 may be performed by a store module the same as or similar to the store module 26 (shown in FIG. 1 and described above).

Figure 3:
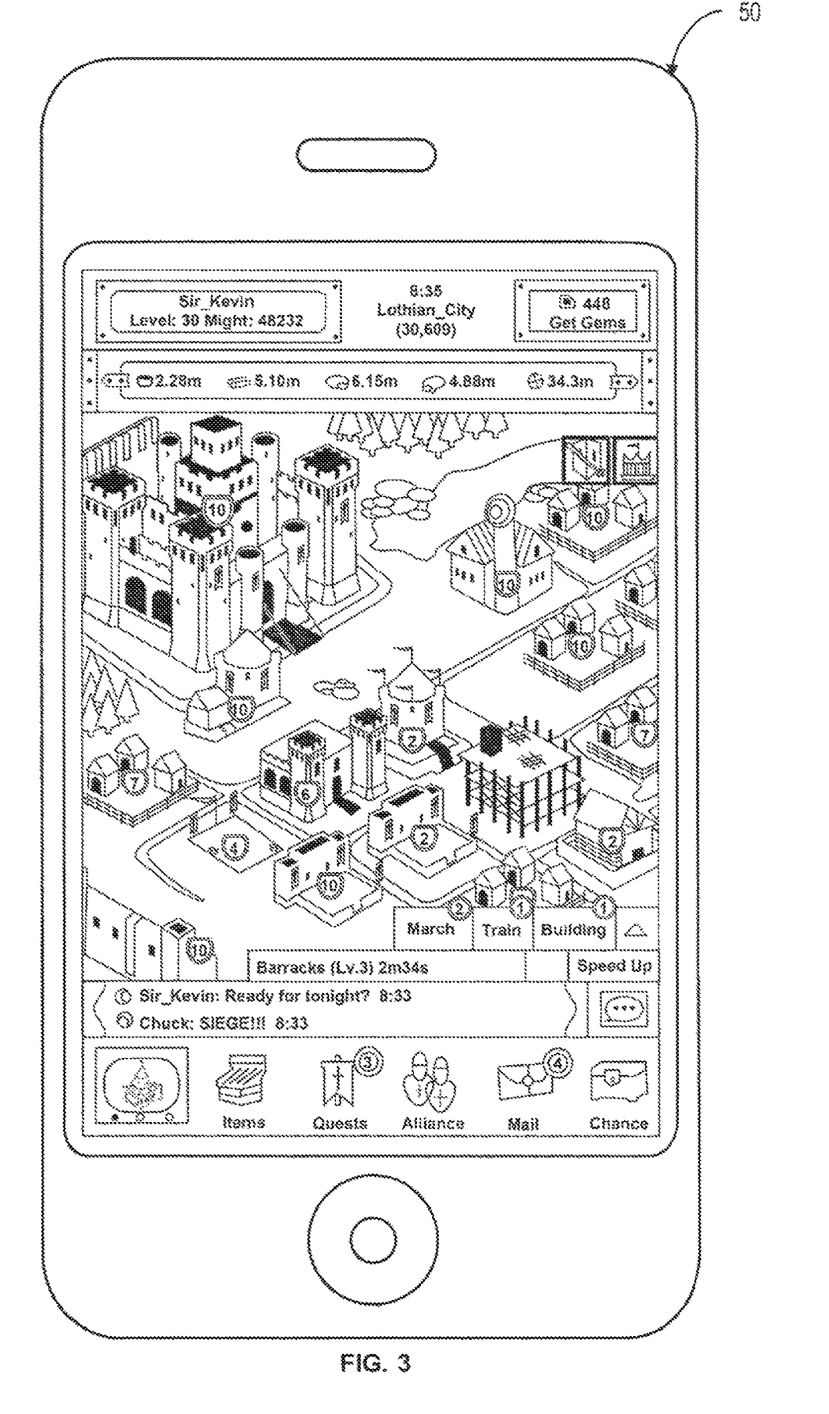
FIG. 3 illustrates an exemplary diagram of a user interface which determines prices for a protection extension in an online game, according to an aspect of the invention.

FIG. 3 illustrates an exemplary diagram of a user interface 50 which determines prices for a protection extension in an online game, according to an aspect of the invention. In some implementations, the user may play the game through a mobile phone. In some implementations, the user may use various platforms to play the game. Platforms may include hardware platforms, operating system platforms and/or software platforms.

Figure 4:
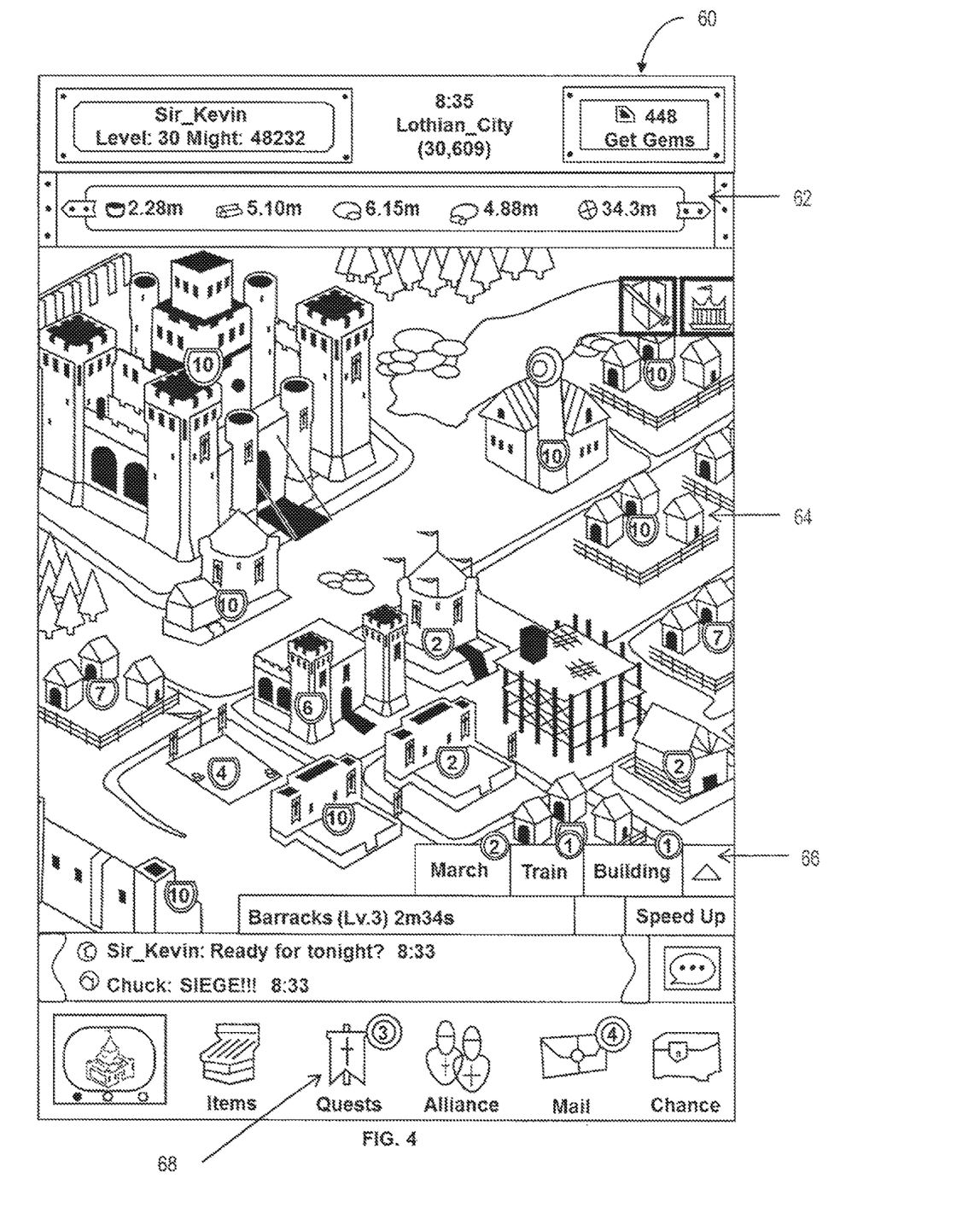
FIG. 4 illustrates an exemplary diagram of a user interface which determines prices for a protection extension in an online game, according to an aspect of the invention.

FIG. 4 illustrates an exemplary diagram of a user interface 60 which determines prices for a protection extension in an online game, according to an aspect of the invention. As shown, the user interface 60 enables a user to determine how many virtual items the user has acquired 62. The user interface 60 enables a user to choose which task to complete. For example, a user may choose to upgrade cottages 64 or select which parameters the user wishes to upgrade, whether that is march, train, building, and/or any other game parameter 66. The user interface 60 allows a user to see what tasks need completing 68.

Figure 5:
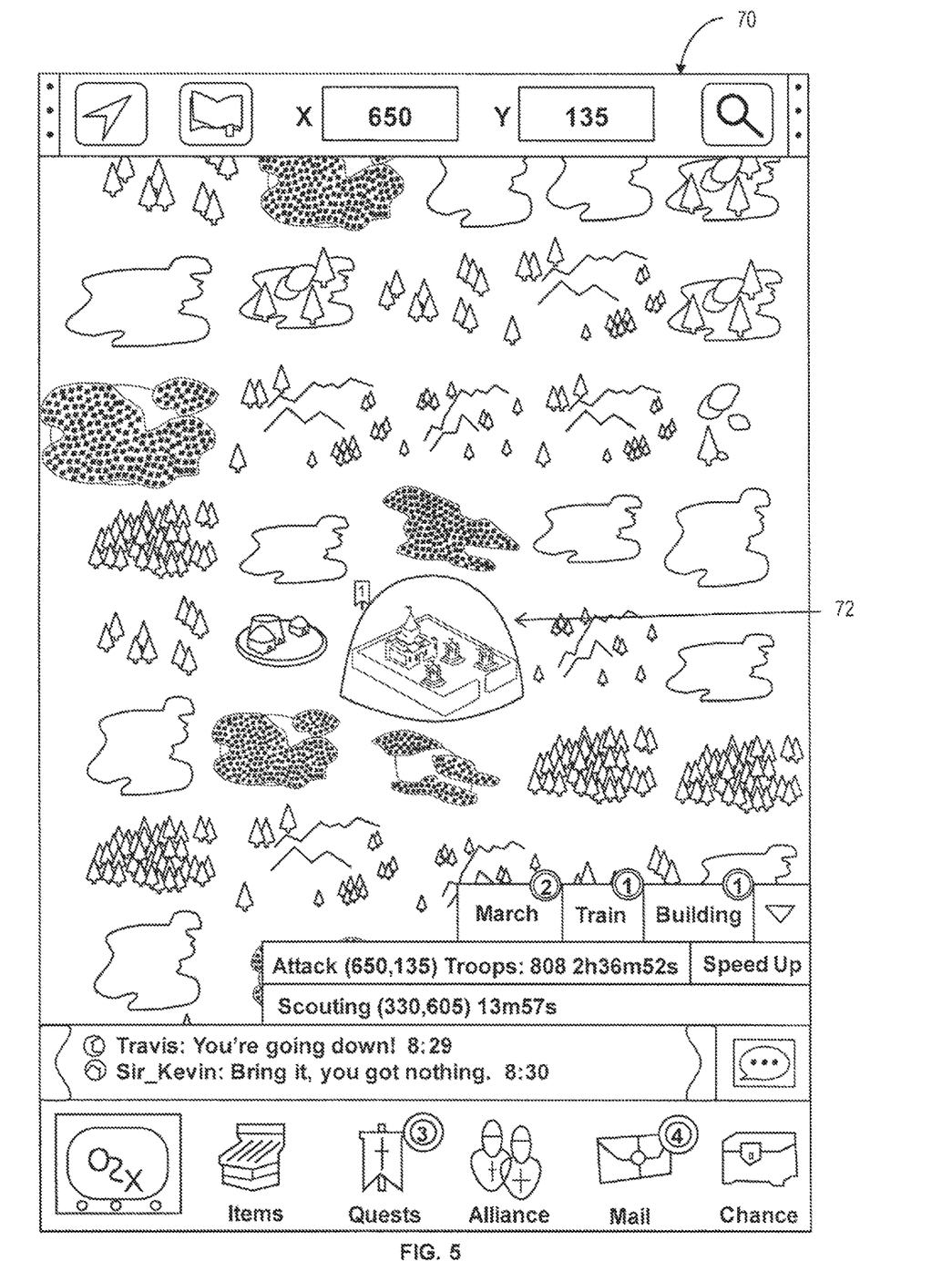
FIG. 5 illustrates an exemplary diagram of a user interface which determines prices for a protection extension in an online game, according to an aspect of the invention.

FIG. 5 illustrates an exemplary diagram of a user interface 70 which determines prices for a protection extension in an online game, according to an aspect of the invention. In some implementations, a user kingdom 72 may not be attacked when under protection. In some implementations, protection may be depicted by a dome type display, and/or a circle around the kingdom, and/or any other visual mechanism may be used to depict protection.

Figure 6:
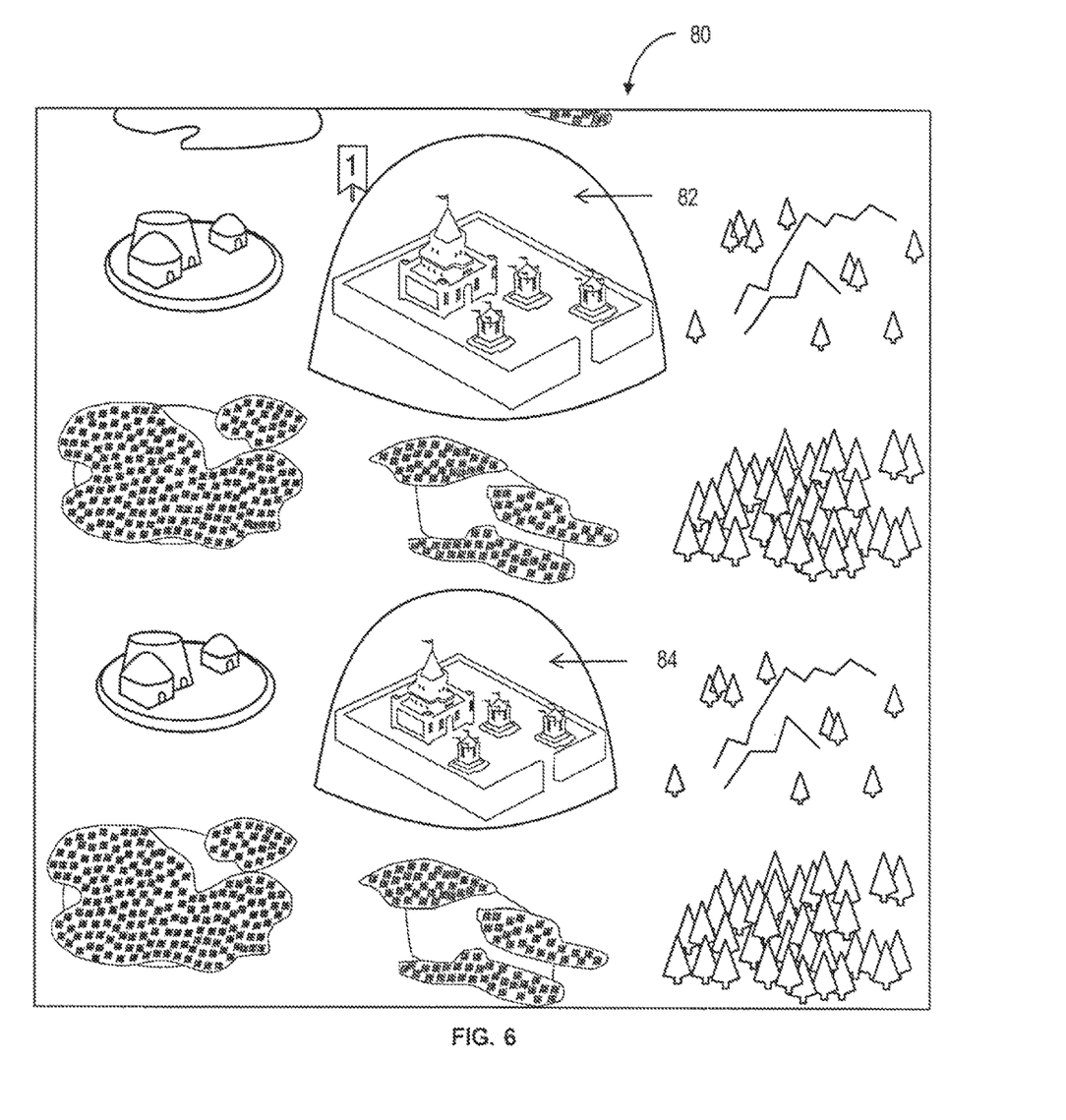
FIG. 6 illustrates an exemplary diagram of a user interface which determines prices for a protection extension in an online game, according to an aspect of the invention.

FIG. 6 illustrates an exemplary diagram of a user interface 80 which determines prices for a protection extension in an online game, according to an aspect of the invention. In some implementations, protection may be depicted by a dome type display, and/or a circle around the kingdom, and/or any other visual mechanism may be used. In some implementations, multiple users may be under protection at the same time. The first user 82 may not attack the second user 84 while either is under protection. The second user 84 may not attack the first user 82 while under protection.

Figure 7:
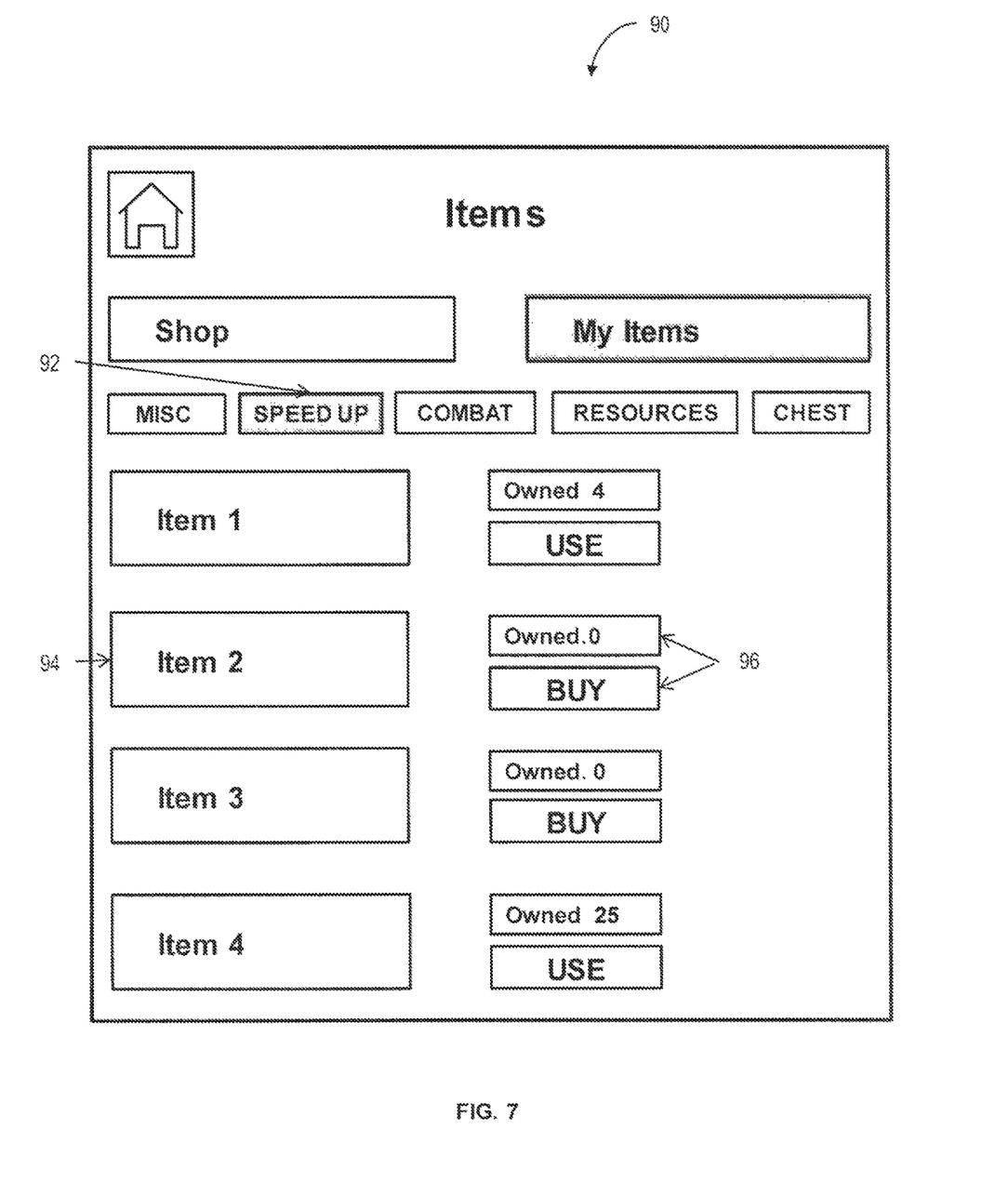
FIG. 7 illustrates an exemplary diagram of a user interface which determines prices for a protection extension in an online game, according to an aspect of the invention.

FIG. 7 illustrates an exemplary diagram of a user interface 90 which determines prices for a protection extension in an online game, according to an aspect of the invention. In some implementations, the user may select the my items tab, and select from a category 92 of virtual in-game goods to use in game. The virtual in-game goods may include purchasing player protection and/or extensions of protection. In some implementations, the categories may include one or more: miscellaneous, speed up, combat, resources, chest, and/or any other category. Each category contains lists of items 94 that a user owns and/or may use or purchase 96 in the game.

It would be understood by one of ordinary skill in the art that the interfaces may not be limited to the embodiment illustrated in FIGS. 3, 4, 5, 6 and 7. The interfaces may be associated with any objective, activity, action, or a combination thereof.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for determining prices for a protection extension, the system comprising:
one or more processors configured by machine-readable instructions to:
execute a game instance of a game space for an online game, implement the game instance of the game space, facilitate presentation of views of the game space on client computing platforms associated with users, and provide game entities to the users to enable interaction of the users with the game space and/or each other by performing operations in the game space in response to commands received over a network from the client computing platforms associated with the users;
manage user profiles, the user profiles including in-game parameters of the users that characterize gameplay of individual ones of the users, the user profiles including a first user profile of a first user and a second user profile of a second user;
provide protection to one or more game entities associated with the users which are protected during a protection time period such that under protection the one or more game entities are immune from in-game attacks without further interaction by the user such that the one or more game entities are not able to be attacked when under protection, the users including the first user and the second user both playing the online game;
determine a power parameter value for the first user during the protection time period, wherein the in-game parameters of the users include a strength associated with the user in the online game, wherein the power parameter value is determined for the first user based on the strength of the first user relative to the strength of other users in the online game during the protection time period;
determine an end time for the protection time period based on the power parameter value;
effectuate presentation of offers to sell virtual items to the users, the virtual items including an extension item that is usable in the game space to extend the protection time period for at least one of the one or more game entities; and
determine a cost of the extension item, wherein the cost of the extension item is based, at least in part, on a user level in the online game.

2. The system of claim 1, wherein the one or more processors are configured to provide protection to one or more game entities comprising one or more: characters, troops, cities, castles, or dragons.

3. The system of claim 1, wherein the one or more processors are configured such that the strength of the first user relative to the strength of other users is determined based on one or more of: in-game troops, virtual currency, one or more resources, user level in game, successful attacks, successful defenses, virtual technology level, virtual civilian population, number of cities or realms, or acquired cities.

4. The system of claim 1, wherein the one or more processors are configured by machine-readable instructions to determine the end time for the protection time period based on an in-game parameter value.

5. The system of claim 1, wherein the one or more processors are configured such that responsive to a determination that the power parameter value of the user obtains a threshold power parameter value during the protection time period, an offer for extension of the protection time period is provided.

6. The system of claim 1, wherein the one or more processors are further configured such that the in-game parameters comprise one or more: power parameter value for the first user, power parameter values for neighboring users, susceptibility to being attacked by neighboring users, or rate of being raided by neighboring users.

7. The system of claim 6, wherein the neighboring users are determined based on a proximate location to the first user.

8. The system of claim 1, wherein the one or more processors are configured such that responsive to the in-game parameters for the first user indicating a relatively high strength of the first user in-game, the cost of an extension item for the first user is increased.

9. The system of claim 1, wherein the one or more processors are further configured such that responsive to the in-game parameters for the first user and the in-game parameters for the second user indicating a higher in-game strength for the first user than the second user, a cost of an extension item is determined to be greater for the first user than a cost of an extension item for the second user.

10. A computer implemented method for determining prices for a protection extension, the method comprising:

executing an instance of a game space for an online game, implementing the instance of the game space to facilitate participation by users in an online game that takes place in the game space, facilitating presentation of views of the game space on client computing platforms associated with users, and providing game entities to the users to enable interaction of the users with the game space and/or each other by performing operations in the game space in response to commands received over a network from the client computing platforms associated with the users;

managing user profiles, the user profiles including in-game parameters of the users that characterize gameplay of individual ones of the users, the user profiles including a first user profile of a first user and a second user profile of a second user;

providing protection to one or more game entities associated with the users which are protected during a protection time period such that under game protection the one or more game entities are immune from in-game attacks without further interaction by the user such that the one or more game entities are not able to be attacked when under protection, the users including the first user and the second user both playing the online game;

determining a power parameter value for the first user during the protection time period, wherein the in-game parameters of the users include a strength associated with the user in the online game, wherein the power parameter value is determined for the first user based on the strength of the first user relative to the strength of other users in the online game during the protection time period;

determining an end time for the protection time period based on the power parameter value;

effectuating presentation of offers to sell virtual items to the users, the virtual items including an extension item that is usable in the game space to extend the protection time period for at least one of the one or more game entities; and determining a cost of the extension item, wherein the cost of the extension item is based, at least in part, on a user level in the online game.

11. The method of claim 10, wherein providing protection to one or more game entities comprising one or more: characters, troops, cities, castles, or dragons.

12. The method of claim 10, wherein the strength of the first user relative to the strength of other users is determined based on one or more of: in-game troops, virtual currency, one or more resources, user level in game, successful attacks, successful defenses, virtual technology level, virtual civilian population, number of cities or realms, or acquired cities.

13. The method of claim 10, wherein determining an end time for the protection time period is based on the power parameter value.

14. The method of claim 10, wherein responsive to a determination that the power parameter value of the user obtains a threshold power parameter value during the protection time period an offer for extension of the protection time period is provided.

15. The method of claim 10, wherein the in-game parameters comprise one or more: power parameter value for the first user, power parameter values for neighboring users, susceptibility to being attacked by neighboring users, or rate of being raided by neighboring users.

16. The method of claim 15, wherein the neighboring users are determined based on a proximate location to the first user.

17. The method of claim 10, wherein responsive to the in-game parameters for the first user indicating a relatively high strength of the first user in-game, the cost of an extension item for the first user is increased.

18. The method of claim 10, wherein responsive to the in-game parameters for the first user and the in-game parameters for the second user indicating a higher in-game strength for the first user than the second user, a cost of an extension item is determined to be greater for the first user than a cost of an extension item for the second user.

* * * * *